(12) United States Patent
Ohmori

(10) Patent No.: US 7,780,331 B2
(45) Date of Patent: Aug. 24, 2010

(54) SURFACE ILLUMINANT EQUIPMENT

(75) Inventor: Atsushi Ohmori, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 316 days.

(21) Appl. No.: 12/104,868

(22) Filed: Apr. 17, 2008

(65) Prior Publication Data
US 2008/0259644 A1 Oct. 23, 2008

(30) Foreign Application Priority Data
Apr. 19, 2007 (JP) ............................. 2007-110504

(51) Int. Cl.
F21V 7/04 (2006.01)
G02B 5/18 (2006.01)
G02B 27/10 (2006.01)

(52) U.S. Cl. ..................... 362/620; 362/617; 362/626; 359/570; 359/625

(58) Field of Classification Search ......... 362/617–620, 362/626; 359/570, 625
See application file for complete search history.

(56) References Cited

U.S. PATENT DOCUMENTS 6,277,471 B1 * 8/2001 Tang ........................ 428/172
6,811,274 B2 * 11/2004 Olczak ...................... 362/606
2007/0010594 A1 * 1/2007 Wang et al. ................ 522/182
2007/0047254 A1 * 3/2007 Schardt et al. ............. 362/607

FOREIGN PATENT DOCUMENTS

| JP | 05-203947  | 8/1993 |
| JP | 2000-221329 | 8/2000 |

* cited by examiner

Primary Examiner—Jacob Y Choi
Assistant Examiner—David J Makiya
(74) Attorney, Agent, or Firm—Rankin, Hill & Clark LLP

(57) ABSTRACT

A plurality of convex strip portions are formed on a front surface (or a back surface) of a light guiding plate, extending in a direction from a light incidence plane to an opposite side surface. A concave portion is formed on a side surface of each convex strip portion. An inner wall of the concave portion is formed from at least two flat planes inclined with respect to three axial directions orthogonal to each other (X, Y and Z axial directions), respectively. Thereby, damage to the surface illuminant equipment such as a light guiding plate due to the interference between a back surface and units disposed on the back surface of the light guiding plate is prevented, while preventing a linear part with relatively low luminance from being viewed from the front surface of the light guiding plate.

4 Claims, 6 Drawing Sheets

SURFACE ILLUMINANT EQUIPMENT

BACKGROUND OF THE INVENTION

1. Field of the Invention

The present invention relates to a surface illuminant equipment used in a back light for a liquid crystal display or the like.

2. Description of the Related Art

As this type of surface illuminant equipment, there has been commonly known one in which a side surface of a light guiding plate formed from a translucent material, such as an acryl resin or the like, is set as a light incidence plane for a light from a light source, the light from the light source disposed opposite to the light incidence plane is guided to the light guiding plate and a part of the source light is emitted from a front surface of the light guiding plate serving as a light emitting plane (for example, refer to Japanese Patent Laid-open No. 2000-221329 and No. H5-203947).

In the surface illuminant equipment, to the front surface (light emitting plane) side of the light guiding plate, there is provided an optical sheet, such as a prism sheet or a dispersion sheet, for adjusting the propagation course of the light emitted from the front surface; to a back surface side of the light guiding plate, there is provided a reflection sheet for reflecting the light emitted from the back surface toward the front surface. One of the front surface and the back surface of the light guiding plate is formed with a dot pattern (a pattern dotted with micro concaves or micro convexes) for reflecting the source light guided to the inner side of the light guiding plate and transmitting therein by printing, machining or the like. In order to uniformize the luminance of the light emitted from the front surface of the light guiding plate, the dot pattern is so disposed that the density of the dot pattern (numbers of dots per unit area) and the size of each dot vary with respect to a distance to the light source.

The other one of the front surface and the back surface of the light guiding plate (surface opposite to the surface formed with the dot pattern), as disclosed in Japanese Patent Laid-open No. 2000-221329 and No. H5-203947, may be formed with a prism extending along the guiding direction (a direction vertical to the incidence plane) of the source light to the light guiding plate. However, the other surface may also be formed to have a mirror shape.

However, in the conventional surface illuminant equipment, each dot in the dot pattern is a convex or concave formed with respect to the flat front surface or back surface of the light guiding plate. Therefore, for the surface illuminant equipment having the dot pattern formed on the flat front surface or back surface of the light guiding plate, there are such problems as described in the following.

That is to say, after the source light has been guided to the light guiding plate, when the front surface (light emitting plane) of the light guiding surface is viewed from the width direction thereof, those dotted portions with relatively high luminance are visibly observed sparkling on the front surface of the light guiding plate at the respective dot position. In other words, there arises luminance irregularity like the dot pattern for the luminance distribution on the front surface of the light guiding plate. Moreover, when the front surface of the light guiding plate is viewed via the prism sheet disposed on the front surface side, the dotted portions are dispersed by the prism sheet in the direction parallel to prisms of the prism sheet, accordingly, for example as illustrated in FIG. 6, linear portions A with relatively low luminance are visibly observed locally.

Consequently, when the conventional surface illuminant equipment is used as, for example, a back light for a liquid crystal display, there is a problem that only parts of an image corresponding to the linear portions are visibly observed and a display irregularity happens to the image displayed on the liquid crystal display.

The reason why the light having the dotted portions with relatively high luminance is emitted from the front surface of the light guiding plate as described above may be considered as the follows. An edge for each dot has roundness to some extent, thus while the edge is functioning as a condensing lens, an incident light to the edge is not reflected to the desired direction but scattered and it is easier for the light to be emitted to the width direction of the light guiding plate or a direction close to the width direction. Thereby, the light with relatively high luminance at each dot position is emitted to the width direction of the light guiding plate or a direction close to the width direction. And the light of the dotted portions emitted from the front surface of the light guiding plate via the edge thereof becomes the linear portions with relatively low luminance since the propagation course thereof has been altered greatly to an inclined direction with respect to the width direction of the light guiding plate in the prism sheet.

Moreover, the conventional surface illuminant equipment has the following problem. In the case where the surface illuminant equipment is used, for example, as a back light for a liquid crystal display, the back surface of the light guiding plate is provided with various units such as a driver board for the liquid crystal display, a connector, a signal line and others with a reflection sheet disposed therebetween. Therefore, those units interfere (collide) with the back surface of the light guiding plate via the reflection sheet by vibration, impact and others, exerting an acting force on the light guiding plate or the like of the surface illuminant equipment between the liquid crystal display on the front surface and the units on the back surface of the light guiding plate.

Thus, in the case where the dots of the dot pattern on the light guiding plate are micro convex portions, especially in a location where the density of the dots is small, due to the interference between the light guiding plate and the units, it is easy for the acting force to be concentrated on each dot. As a result, there is a problem that the dots are easy to get damaged.

SUMMARY OF THE INVENTION

The present invention has been accomplished in view of the aforementioned problems, and it is therefore an object of the present invention to provide a surface illuminant equipment which prevents damage to the surface illuminant equipment such as a light guiding plate due to the interference between a back surface and units disposed on the back surface of the light guiding plate, while preventing a linear part with relatively low luminance from being viewed from the front surface of the light guiding plate.

According to a first aspect of the present invention, there is provided a surface illuminant equipment which includes a light guiding plate for guiding a source light from a light incidence plane which is set from at least one side surface from a pair of side surfaces opposing to each other; a prism sheet disposed opposing to a light emitting plane which is set from a front surface of the light guiding plate having a front surface and a back surface; and a reflection sheet disposed opposing to the back surface of the light guiding plate, comprising: a plurality of convex strip portions integrally formed with the light guiding plate on either one of the front surface and the back surface of the light guiding plate, extending in a direction from one side surface of the pair of side surfaces to the other and disposed in parallel in a direction orthogonal to the extending direction; and a plurality of concave portions formed on a side surface of each of the plurality of convex strip portions with an interval along the extending direction of the convex strip portion, wherein an inner wall of each concave portion is formed from at least two flat planes inclined with respect to three axial directions orthogonal to each other set from the extending direction of each of the plurality of convex strip portions, a width direction of the light guiding plate, and a direction orthogonal to both the extending direction and the width direction, respectively (first invention).

According to the first invention, each concave portion formed on the side surface of each convex strip portion fundamentally functions as a dot which reflects the incident light to the inner wall of the concave portion among the source light guided into the light guiding plate. That is to say, the entire concave portion existing on one surface of the front surface and the back surface of the light guiding plate corresponds to the dot pattern in the conventional surface illuminant equipment. According to the first invention, the inner wall of each concave portion (each dot in the surface illuminant equipment of the first invention) is formed from at least two flat planes inclined with respect to the three axial directions, respectively.

Therefore, the light reflected by the inner wall of each concave portion is easy to propagate in a direction sufficiently inclined with respect to the width direction of the light guiding plate. Moreover, even though the edge (an intersection between the flat planes and a border line of each flat plane) of the inner wall of each concave portion has roundness, the light incident to the edge will propagate in the direction sufficiently inclined with respect to the width direction of the light guiding plate from the edge. As a result, the light reflected or dispersed by the inner wall (flat plane) of each concave portion or the edge of the inner wall is prevented from concentrating on one axis in the width direction or a direction close to the width direction of the light guiding plate. Additionally, the prism sheet ensures the light whose propagation course may be altered to the width direction or a direction close to the width direction of the light guiding plate to emit easily from the front surface of the light guiding plate. Consequently, the dotted portion with relatively high luminance is prevented from occurring at each concave portion when the front surface of the light guiding plate is viewed directly from the width direction. Furthermore, when the front surface of the light guiding plate is viewed through the prism sheet, the linear portion with relatively low luminance is also prevented from occurring.

Therefore, it is possible to prevent the linear portion with relatively low luminance from being viewed from the front surface of the light guiding plate according to the present invention.

Further, each concave portion formed on the side surface of the convex strip portion is not a dot but one extending between a pair of the side surfaces of the light guiding plate. Thus, even though there is an acting force exerted on the light guiding plate in the width direction thereof due to the interference between the back surface and the units disposed on the back surface of the light guiding plate, the acting force can be prevented from concentrating locally on any one of the convex strip portion. Consequently, the convex strip portion and the concave portion formed thereon can be prevented from getting damaged.

According to the present invention, the inner wall of each concave portion is formed from two flat planes intersected at the penetralia of the concave portion. Accordingly, each concave portion has a simple configuration, and thus, it is easy to form the concave portion.

In the present invention, in the case where two arbitrary convex strip portions adjacent mutually among the plurality of convex strip portions are set as a first convex strip portion and a second convex strip portion, respectively, it is preferable that the concave portion formed on the side surface of the first convex strip portion closer to the second convex strip portion and the concave portion formed on the side surface of the second convex strip portion closer to the first convex strip portion are axisymmetrical to a central axis between the first convex strip and the second convex strip when either one of the front surface and the back surface is viewed in the width direction of the light guiding plate.

Accordingly, the concave portions respectively formed on opposite side surfaces of two arbitrary convex strip portions adjacent mutually are axisymmetrical to the central axis. Therefore, when the concave portion is formed on each convex strip portion via a molding process by using, for example, a mold, it is easy to make the mold.

Moreover in the present invention, a top surface of each convex strip portion is preferably flat. Accordingly, even though there is an acting force exerted on the light guiding plate in the width direction thereof due to the interference between the back surface and the units disposed on the back surface of the light guiding plate, it is easy to disperse the acting force over the top surface of each convex strip portion, therefore capable of preventing effectively the convex strip portion and the concave portion formed thereon from getting damaged.

DETAILED DESCRIPTION OF THE PREFERRED EMBODIMENTS

Hereinafter, an embodiment of the present invention will be described with reference to FIG. 1 to FIG. 4.

Firstly, the entire configuration of a surface illuminant equipment of the present embodiment will be described with reference to FIG. 1 and FIG. 2.

Figure 1:
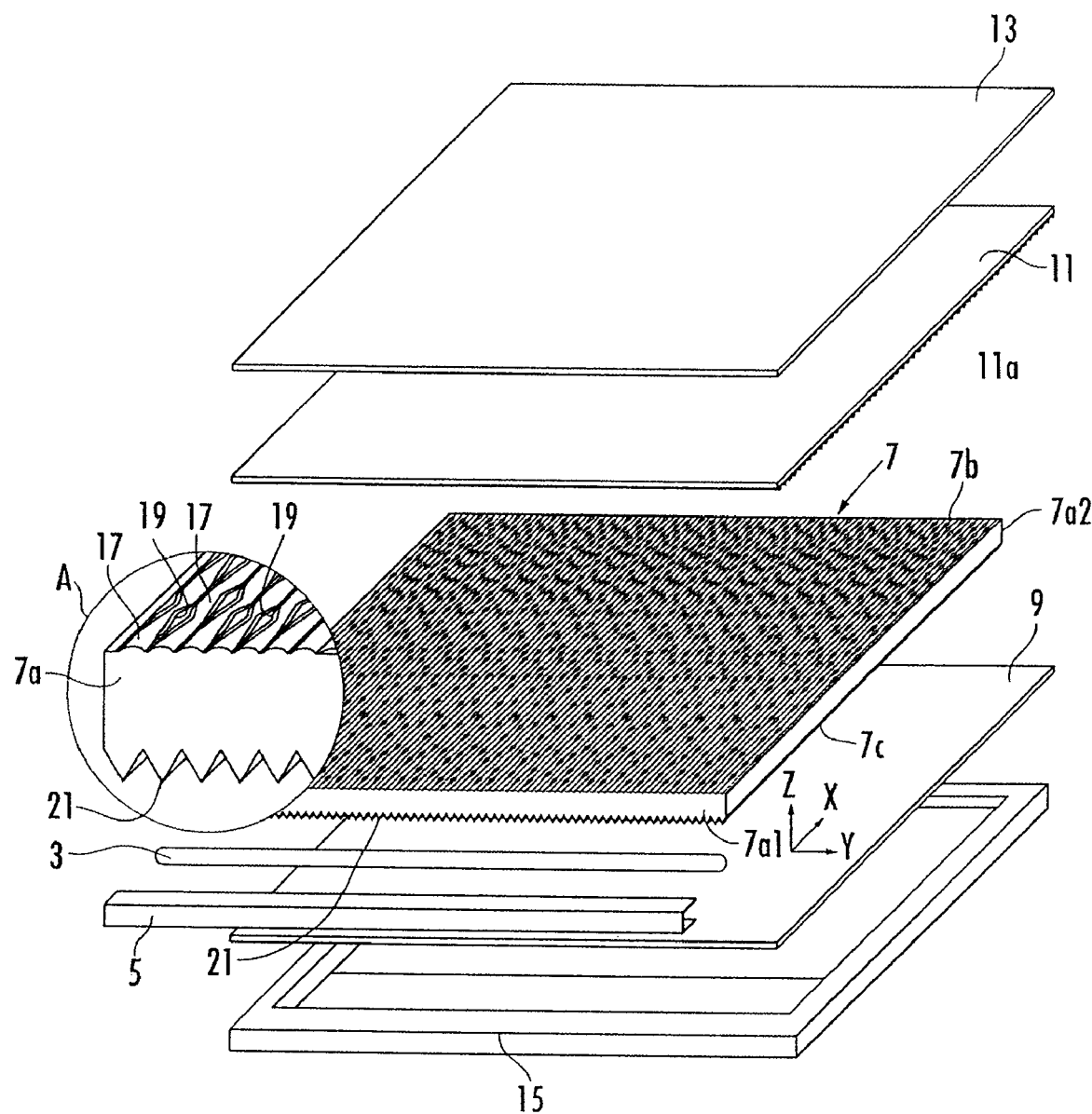
FIG. 1 is an exploded perspective view of a surface illuminant equipment according to an embodiment of the present invention.

Referring to FIG. 1, the surface illuminant equipment 1 of the present embodiment includes a light source 3, a reflector 5, a light guiding plate 7, a reflection sheet 9, a prism sheet 11, a dispersion sheet 13 and a frame body 15. In addition, the circled portion in FIG. 1 is a partially enlarged view of the light guiding plate 7.

In the present embodiment, the light source 3 is a linear light source such as a cold cathode fluorescent tube, a hot cathode fluorescent tube and the others. However, it is also possible to use, for example, a plurality of LED arrayed in one column as the light source.

The light guiding plate 7 has an external view of a square shape and is formed from a translucent material, such as an acryl resin, polycarbonate resin or the like. In the present embodiment, among a pair of opposite side surfaces 7a1 and 7a2 of the light guiding plate 7, one side surface 7a1 (the side surface at the front side in FIG. 1) is set as a light incidence plane for a light ray from the light source 3 to the light guiding plate 7. The light source 3 is therefore disposed opposite to the light incidence plane 7a1 with its longitudinal direction same as the longitudinal direction of the light incidence plane 7a1. In the present embodiment, to the side of the top surface of the light incidence plane 7a1 of the light guiding plate 7, there is attached the reflector 5 to cover the periphery of the light source 3. Thus, the source light emitted from the light source 3 is either guided directly to the light guiding plate 7 from the light incidence plane 7a1 or guided to the light guiding plate 7 from the light incidence plane 7a1 after reflected from the reflector 6.

Figure 2:
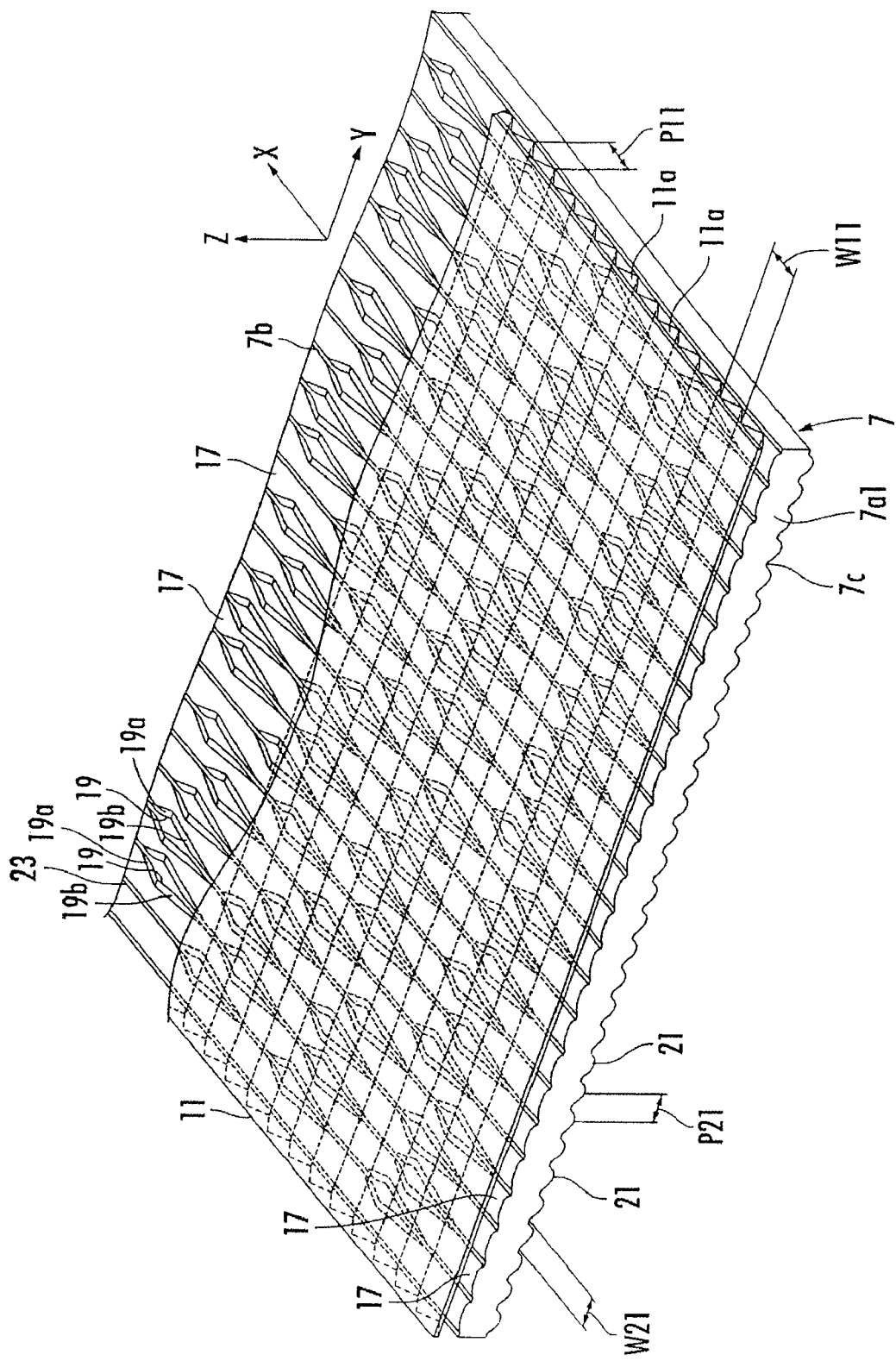
FIG. 2 is a perspective view illustrating an enlarged part of a light guiding plate and a prism sheet included in the surface illuminant equipment illustrated in FIG. 1.

As illustrated in FIG. 1 and FIG. 2, in the descriptions hereinafter, a direction orthogonal to the light incidence plane 7a1 is set as X axial direction, and two axial directions orthogonal to each other in a plane which is orthogonal to the X axial direction as Y axial direction and Z axial direction, respectively. The X, Y and Z axial directions are orthogonal mutually. In the present embodiment, the Z axial direction is set as the width direction (vertical direction in FIG. 1) of the light guiding plate 7 and the Y direction is set as the longitudinal direction (the longitudinal direction of the light source 3) of the light incidence plane 7a1. The X axial direction, to be explained in an alternate way, is a direction from one side surface of the light guiding plate 7, that is, the light incidence plane 7a1, toward the other side surface 7a2 opposite to the light incidence plane 7a1, generally the guiding direction of the source light from the light source 3 to the light guiding plate 7.

Although in the present embodiment, only one side surface 7a1 of the light guiding plate 7 is set as the light incidence plane, it is also possible to set both the side surface 7a1 and the opposite side surface 7a2 as the light incidence plane and the source light will be guided into the light guiding plate 7 from the two side surfaces 7a1 and 7a2.

A front surface 7b, an upper surface in the drawings, of the light guiding plate 7 serves as a light emitting plane emitting light outside. The front surface 7b is formed with, as illustrated in an encircled view in FIG. 1 and FIG. 2, a plurality of convex strip portions 17 extending in parallel to each other in the X axial direction. The convex strip portions 17 are disposed in parallel with a given interval (a given pitch) substantially across the entire surface of the front surface 7b of the light guiding plate 7. Further, a side surface of each convex strip portion 17 is provided with a plurality of concave portions 19. A detailed description on the convex strip portions 17 and the concave portions 19 will be carried out hereinafter.

A back surface 7c, a lower surface in FIG. 1, of the light guiding plate 7 is formed with a plurality of prisms 21 extending in parallel to each other in the X axial direction (same direction as the convex strip portions 17). The prisms 21 are disposed in parallel with a given interval (a given pitch) substantially across the entire surface of the back surface 7c of the light guiding plate 7. The cross section (section orthogonal to the X axial direction) of each prism 21 is substantially of a triangular shape, in other words, each prism 21 is roughly a triangular prism extending in the X axial direction. The prisms 21 are formed integral with the light guiding plate 7 by injection molding and the like. In addition, referring to FIG. 2, in the present embodiment, a width W21 of each prism 21 in the Y axial direction is, for example, 23.2 μm; an interval P21 (pitch of the array of the prisms 21) of the mutually adjacent prisms 21 and 21 in the Y axial direction is, for example, 29 μm.

The prisms 21 formed on the back surface 7c of the light guiding plate 7 as described above have the function to alter the propagation course of the source light which is guided from the light source 3 into the light guiding plate 7 and propagates in the light guiding plate 7 to the back surface 7c of the light guiding plate 7 so as to increase the light amount (light amount reflected from the reflection sheet 9, which will be described hereinafter) emitted to the outside of the light guiding plate 7 through the back surface 7c.

However, it is not obligatory to form the prisms 21 on the back surface 7c of the light guiding plate 7; it is also possible to form the back surface 7c flat.

The reflection sheet 9 is provided for the back surface 7c of the light guiding plate 7 to cover the entire back surface 7c. The reflection sheet 9 reflects the light emitted from the back surface 7c of the light guiding plate 7 toward the front surface 7b of the light guiding plate 7 so as to make the light return to the light guiding plate 7.

The front surface 7b of the light guiding plate 7 is provided with the prism sheet 11 overlapped with the dispersion sheet 13 to cover the entire front surface 7b. As illustrated in FIG. 1 and FIG. 2, the prism sheet 11 is formed from a plurality of prisms 11a extending in parallel to each other in the Y axial direction of the prism sheet 11 on the front surface 7b. The prisms 11a are disposed in parallel with a given interval (a given pitch) in the X axial direction substantially across the entire surface of the front surface 7b of the light guiding plate 7. The cross section (section orthogonal to the Y axial direction) of each prism 11a is substantially of a triangular shape, in other words, each prism 11a is roughly a triangular prism extending in the Y axial direction. In addition, referring to FIG. 2, in the present embodiment, a width W11 of each prism 11a in the X axial direction is, for example, 50 μm; an interval P11 (pitch of the array of the prisms 11a) of the mutually adjacent prisms 11a and 11a in the X axial direction is, for example, 50 μm.

The prism sheet 11 having the above mentioned prisms 11a functions to adjust the propagation course of the light emitted outside from the front surface 7b (light emitting surface) of the light guiding plate 7 so as to increase the light amount in the width direction or a direction close to the width direction of the light guiding plate 7. The dispersion sheet 13 is used to disperse the light emitted by transmitting through the prism sheet 11 from the front surface 7b of the light guiding plate 7.

The surface illuminant equipment 1 is constituted by assembling the reflector 5 and the light source 3 to the end of the light incidence plane 7a1 in a state that the reflection sheet 9 has been overlapped with the back surface 7c of the light guiding plate 7, and assembling the light guiding plate 7 into the frame body 15 in a state that the prism sheet 11 and the dispersion sheet 13 has been overlapped with the front surface 7b of the light guiding plate 7.

Figure 3:
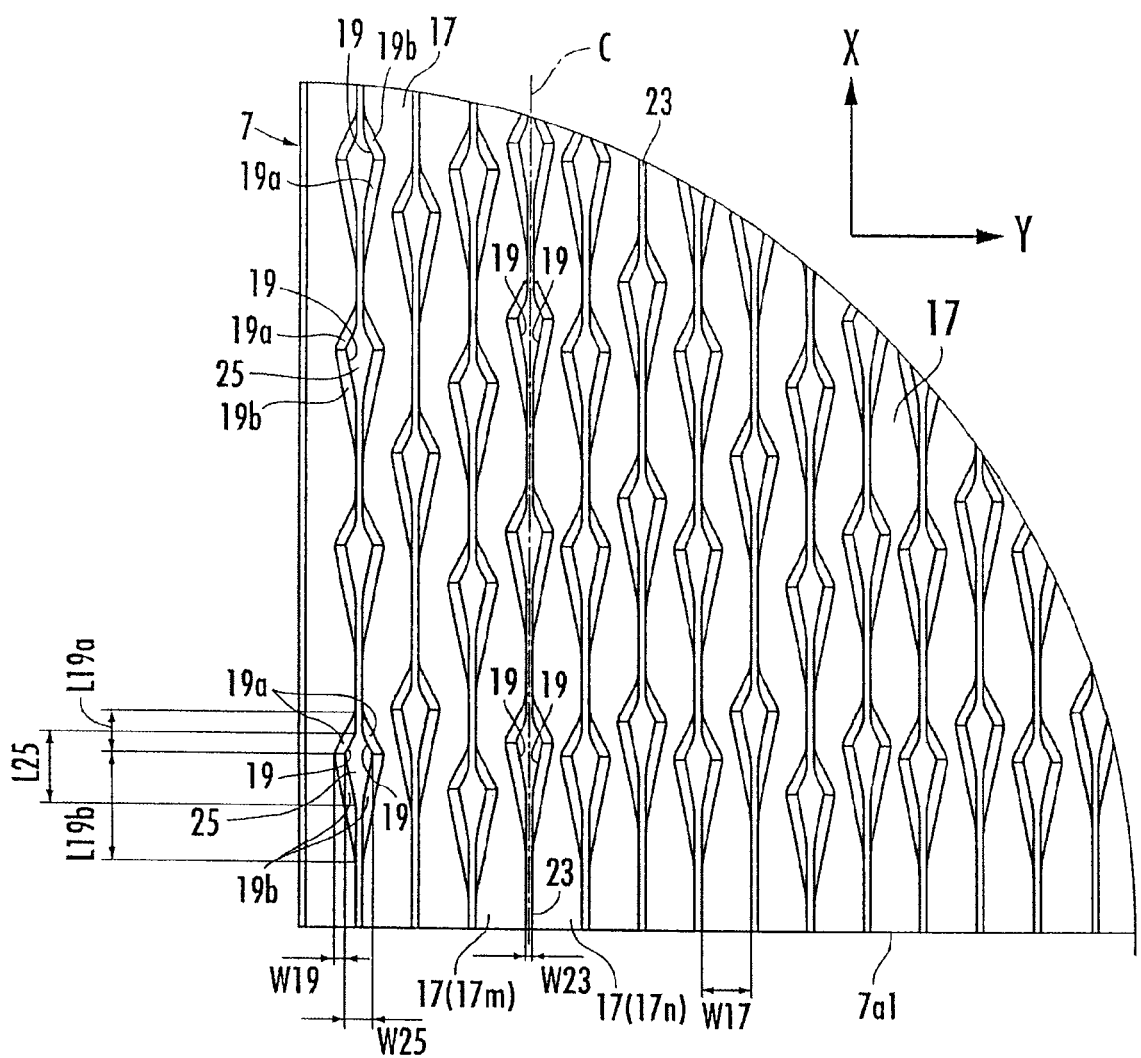
FIG. 3 is a plane view illustrating a part of the light guiding plate illustrated in FIG. 2 in the width direction thereof.

With reference to FIG. 2 and FIG. 3, the convex strip portion 17 formed on the front surface 17b of the light guiding plate 7 and the concave portion 19 formed thereon will be described in detail hereinafter. FIG. 3 is a plane view illustrating a part of the front surface 7b of the light guiding plate 7 illustrated in FIG. 2 viewed in the width direction of the light guiding plate 7.

As illustrated in FIG. 2, each convex strip portion 17 is formed with a substantially flat top surface and an inclined side surface. Between two adjacent convex strip portions 17 and 17, there is provided an interval 23. In the present embodiment, the front surface 7b of the light guiding plate 7 is a flat surface at the location where the interval 23 is present. In addition, similar to the configuration of the prisms 21 on the back surface 7c of the light guiding plate 7, the convex strip portions 17 are formed integral with the light guiding plate 7 by injection molding and the like. Moreover, with reference to FIG. 3, a width W17 of each convex strip portion 17 in the Y axial direction is, for example, 29 μm in the present embodiment; the interval W23 in the Y axial direction is, for example, 4 μm in the present embodiment.

The side surface of each convex strip portion 17 is formed with a plurality of concave portions 19 by concaving the side surface at a plurality of locations with an interval along the extending direction (X axial direction) of the convex portion 17. In the present embodiment, among the plurality of convex strip portions 17 arrayed on the front surface 7b of the light guiding plate 7, each convex strip portion 17 is formed with the concave portions 19 on the two side surfaces thereof, except for the convex strip portions 17 located at two ends of the front surface 7b in the Y axial direction. Here, for the convex strip portions 17 located at two ends of the front surface in the Y axial direction, only the side surface close to its adjacent convex strip portion 17 is provided with the concave portions 19.

In the present embodiment, each concave portion 19 for each convex strip portion 17 is shaped by cutting out the side surface of the convex strip portion 17 to a substantially triangular shape toward the central axis of the convex strip portion 17. As a result, an inner wall of each concave portion 19 is formed from two flat planes 19a and 19b crossed at the penetralia of the concave portion 19. Those flat planes 19a and 19b are inclined (not parallel) with respect to any direction of the X, Y and Z axial directions. In other words, each of the flat planes 19a and 19b is an inclined plane having a magnitude other than zero for any of the components in the X, Y and Z axial directions of its normal line vector. In addition, in the case where the respective normal line vector of the flat planes 19a and 19b is pointed from the inner part of the convex strip portion 17 toward the outside thereof, the respective components in the X axial direction for the flat planes 19a and 19b of each concave portion 19 have mutually inversed directions (mutually different polarity); on the other hand, the respective components in the Y axial direction and Z axial direction for the flat planes 19a and 19b of each concave portion 19 have mutually same directions (mutually identical polarity).

Additionally in the present embodiment, when the front surface 7b of the light guiding plate 7 is viewed in the width direction of the light guiding plate 7, the respective concave portions 19 and 19 formed on the side surfaces opposite to each other in two mutually adjacent convex strip portions 17 and 17 are provided axisymmetrical with respect to the central axis (central axis extending in the X axial direction) between the two mutually adjacent convex strip portions 17 and 17. For example, referring to FIG. 3, two convex strip portions with respective reference numbers 17m and 17n in parenthesis (corresponding to the first convex strip portion and the second convex strip portion in the present invention) representatively stand for the two mutually adjacent convex strip portions 17 and 17, respectively. Herein, the concave portion 19 formed on the side surface of the convex strip portion 17m close to the convex strip portion 17n, and the concave portion 19 formed on the side surface of the convex strip portion 17n close to the convex strip portion 17m, are provided axisymmetrical with respect to the central axis C (the central axis C of the interval 23 between the convex strip portions 17m and 17n), when the front surface 7b of the light guiding plate 7 is viewed in the width direction of the light guiding plate 7. In detail, one concave portion 19 of the concave portions 19 formed on the side surfaces of the convex strip portion 17n close to the convex strip portion 17m is opposing to each concave portion 19 formed on the side surface of the convex portion 17m close to the convex strip portion 17n, and a pair of mutually opposite concave portions 19 and 19 are disposed axisymmetrical with respect to the central axis C. Moreover, to explain in three dimensions, the pair of mutually opposing concave portions 19 and 19 are provided plane-symmetrical with respect to the plane vertical to (parallel to the Z axis) the Y axial direction containing therein the central axis C.

In addition, the front surface 7b of the light guiding plate 7 has a flat portion 25 which is continuous to the interval 23 at a location between the concave portions 19 and 19 mutually opposite in the Y axial direction. With reference to FIG. 3 in the present embodiment, the maximum width W25 of the flat portion 25 between the mutually opposing concave portions 19 and 19 in the Y axial direction is, for example, 16 μm; the length L25 of the flat portion in the X axial direction is, for example, 42 μm. The width W19 of the flat planes 19a and 19b in each concave portion 19 in the Y axial direction is, for example, 6.5 μm; among the flat planes 19a and 19b, the length L19b of the flat plane 19b close to the light incidence plane 7a1 in the X axial direction is, for example, 62.5 μm, and the length L19a of the flat plane 19a close to the light incidence plane 7a2 in the X axial direction is, for example, 25 μm.

When the entire front surface 7b of the light guiding plate 7 is viewed in the width direction thereof, the farther it is away from the light incidence plane 7a1 of the light guiding plate 7 in the X axial direction, the more numbers of the concave portions 19 per unit area (that is the density) are disposed. In other words, the concave portions 19 are disposed loosely when it is closer to the light incidence plane 7a1 of the light guiding plate 7 in the X axial direction; while the concave portions 19 are disposed densely when it is farther away from the light incidence plane 7a1 of the light guiding plate 7 in the X axial direction.

Figure 4:
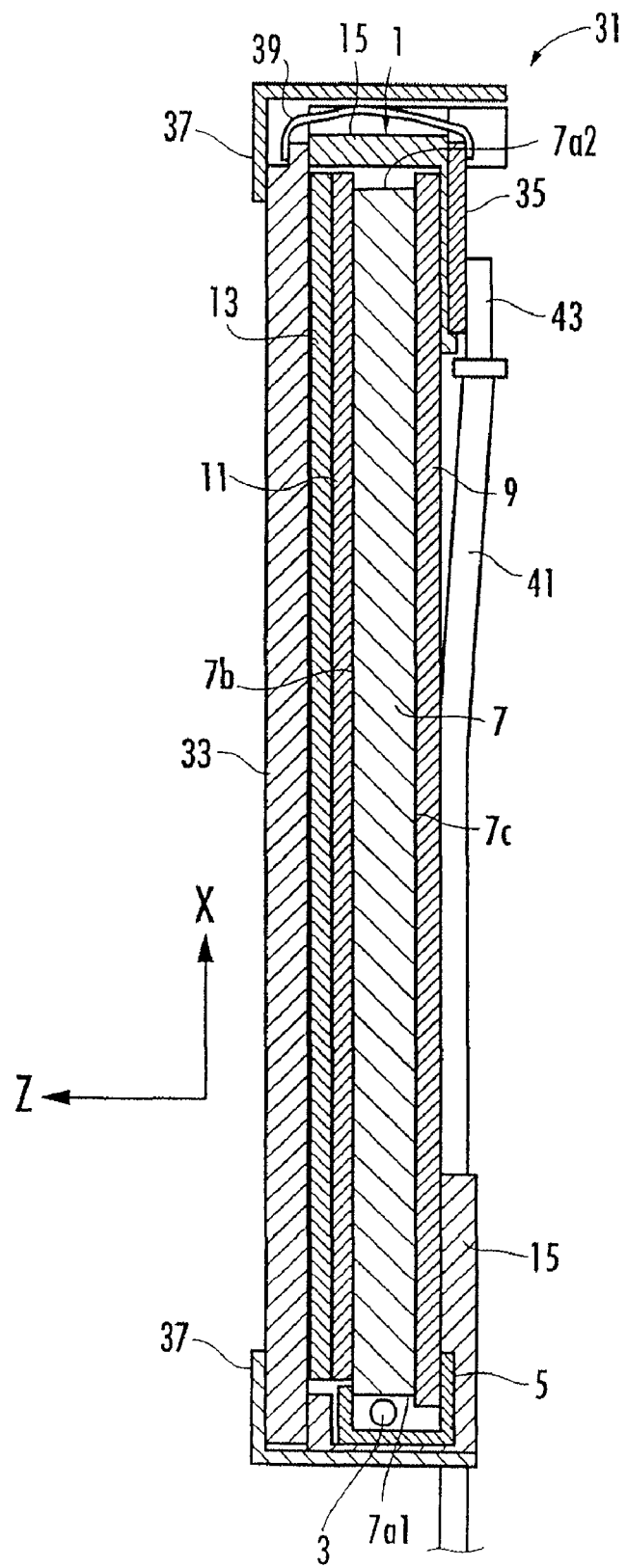
FIG. 4 is a vertical cross-sectional view of a liquid crystal display using the surface illuminant equipment illustrated in FIG. 1 as a back light.

Hereinafter, with reference to FIG. 4, an example of the configuration of a display apparatus having the surface illuminant equipment 1 of the above mentioned configuration serving as a back light for a liquid crystal display (liquid crystal cell), for example. FIG. 4 is a cross-sectional view of the liquid crystal display. In addition, the convex strip portions 17 and the prisms 21 of the light guiding plate 7 and the prisms 11a of the prism sheet 11 are omitted in FIG. 4.

Referring to FIG. 4, the display apparatus 31 includes the surface illuminant equipment 1 described in the above, the liquid crystal display (liquid crystal cell) 33, a driver board 35 which is a driving circuit board for the liquid crystal display 33, and a frame-shaped bezel 37 to cover the outside of the liquid crystal 33 and the surface illuminant equipment 1.

As aforementioned, the surface illuminant equipment 1 is constituted by assembling the reflector 5 and the light source 3 to the end of the light incidence plane 7a1 in a state that the reflection sheet 9 has been overlapped with the back surface 7c of the light guiding plate 7, and assembling the light guiding plate 7 into the frame body 15 in a state that the prism sheet 11 and the dispersion sheet 13 has been overlapped with the front surface 7a of the light guiding plate 7.

The front surface 7b of the light guiding plate 7 of the surface illuminant equipment 1 is provided with the liquid crystal display 33 interposed therebetween with the prism sheet 11 and the dispersion sheet 13. The surface illuminant equipment 1 and the liquid crystal display 33 are held by the bezel 37 attached outside thereof.

The back surface 7c of the light guiding plate 7 is provided with the driver board 35 interposed therebetween with the reflection sheet 9. As illustrated in FIG. 4, the driver board 35 is located close to the side surface 7a2 opposing to the light incidence plane 7a1 of the light guiding plate 7 and attached to the frame body 15 of the surface illuminant equipment 1. Further, the driver board 35 is connected with the liquid crystal display 33 via a signal line 39 wired between the frame 15 and the bezel 37.

Furthermore, the driver board 35 is connected via a connector 43 with a signal line 41 for supplying power to and/or controlling a driving circuit (not shown) mounted thereon. The signal line 41 is wired at the back surface side of the light guiding plate 7 along the reflection sheet 9.

Next, the functions and the effects of the surface illuminant equipment 1 according to the present embodiment will be explained.

Among the source light guided into the light guiding plate 7 via the light incidence plane 7a1 and transmitting in the light guiding plate 7 from the light source 3, the light reached the flat planes 19a and 19b as the inner wall of the concave portion 19 of each convex strip portion 17, are basically reflected from the flat planes 19a and 19b. That is to say, each concave portion 19 functions as the dot in the conventional surface illuminant equipment. In the present embodiment, as described above, the flat planes 19a and 19b are inclined with respect to the X, Y and Z axial directions, respectively. Therefore, the light reflected from the flat planes 19a and 19b constituting the inner wall of each concave portion 19 is easy to propagate in a direction sufficiently inclined with respect to the width direction (Z axial direction) of the light guiding plate 7. Moreover, even though the edge of the inner wall of each concave portion 19 (the intersection of the flat planes 19a and 19b, or the boundary of each of the flat planes 19a and 19b) has roundness, the light entered to the edge is easy to propagate in a direction sufficiently inclined with respect to the width direction (Z axial direction) of the light guiding plate 7. As a result, the light reflected from or dispersed by the inner wall (the flat planes 19a and 19b) or the edge of the inner wall is prevented from concentrating on the axis of the width direction of the light guiding plate 7 or a direction close to the width direction thereof. Furthermore, in the prism sheet 11, it is easy for the light whose propagation course is altered to the width direction or a direction close to the width direction of the light guiding plate 7 to be emitted from the front surface 7b of the light guiding plate 7.

Figure 6:
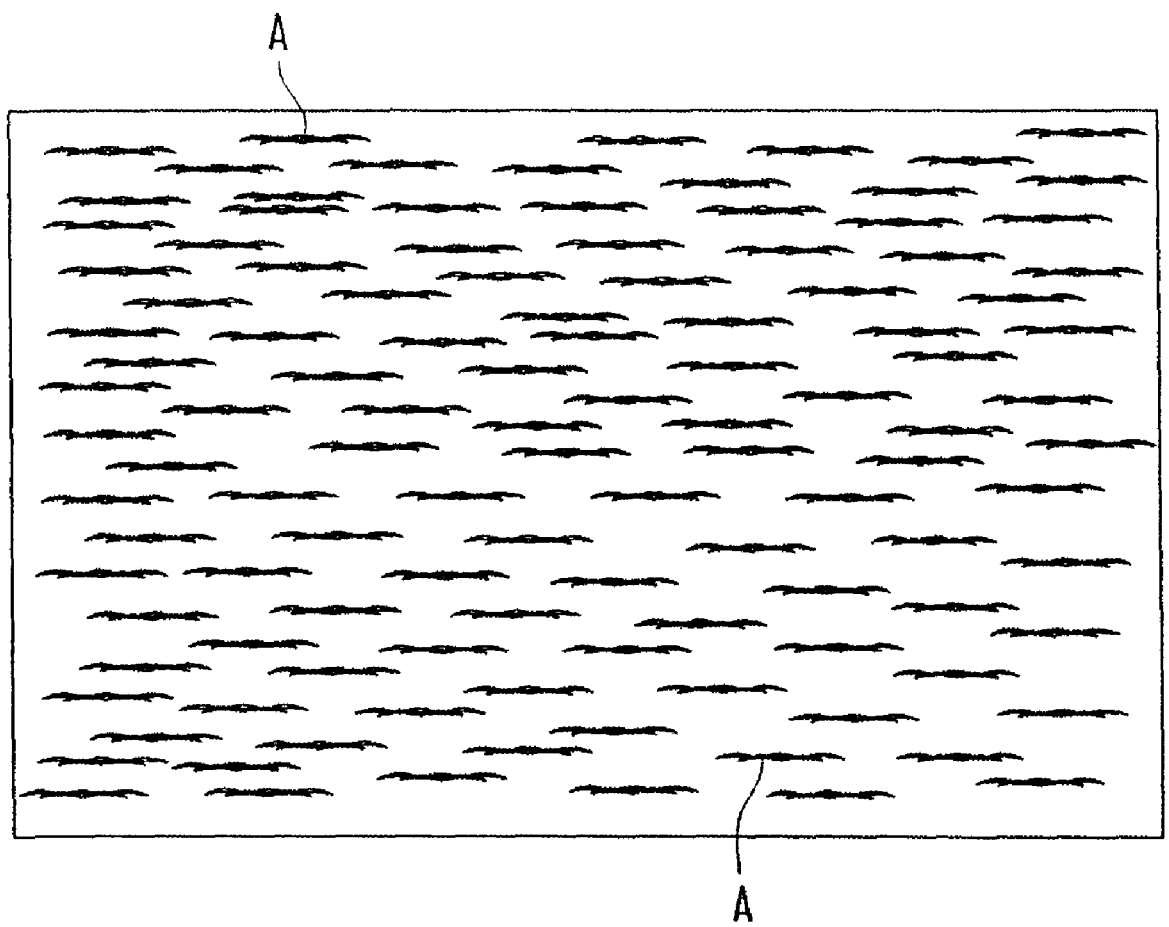
FIG. 6 is a diagram illustrating a linear portion visible in a conventional surface illuminant equipment.

Accordingly, the dotted portion with relatively high luminance is prevented from occurring at each concave portion 19 when the front surface 7b of the light guiding plate 7 is viewed directly from the width direction of the light guiding plate 7. Consequently, the linear portion with relatively low luminance as illustrated in FIG. 6 described above is also prevented from occurring when the front surface 7b of the light guiding plate 7 is viewed via the prism sheet 11.

As a result, it is capable for the display apparatus 31 to prevent displaying irregularity in the image displayed on the liquid crystal display 33.

Since the incident amount of the light whose propagation course has been altered to the width direction or a direction close to the width direction of the light guiding plate 7 (incident amount of light from the light guiding plate 7 to the prism sheet 11) is increased in the prism sheet 11, the prism sheet 11 is capable of improving the average luminance of light emitted from the front surface of the light guiding plate 7 through the prism sheet 11 and the dispersion sheet 13.

In the surface illuminant equipment 1 of the present embodiment, the average luminance for the front surface 7b of the light guiding plate 7 is obtained at about 5864 cd/m$^2$ experimentally. As a comparison, in the case where the same dot pattern (for example, a pattern of dots having the shape of a triangular frustum) as that in the conventional surface illuminant equipment is formed without providing the convex strip portion 17 and the concave portion 19 on the front surface 7b of the light guiding plate 7, the average luminance on the front surface of the light guiding plate is about 5219 cd/m$^2$. More specifically, it has been proved that the average luminance of the front surface of the light guiding plate in the surface illuminant equipment 1 of the present embodiment has been improved by at least 600 cd/m$^2$, compared with that in the conventional surface illuminant equipment.

In the display apparatus 31 described above, there may have an acting force caused by vibrations or the like to push the surface illuminant equipment 1 toward the liquid crystal display 33 from the driver board 35 and the signal line 41. In this case, each of the convex strip portions 17 formed on the side surfaces of the concave portions 19, which serves as the dot being pushed toward the liquid crystal display 33 via the prism sheet 11 and the dispersion sheet 13, is not a dotted one but linearly extended portions, thus, the acting force centered on the convex strip portion 17 locally can be avoided. As a result, damage to the convex strip portion 17 or the concave portions 19 formed thereon can be prevented.

Figure 5:
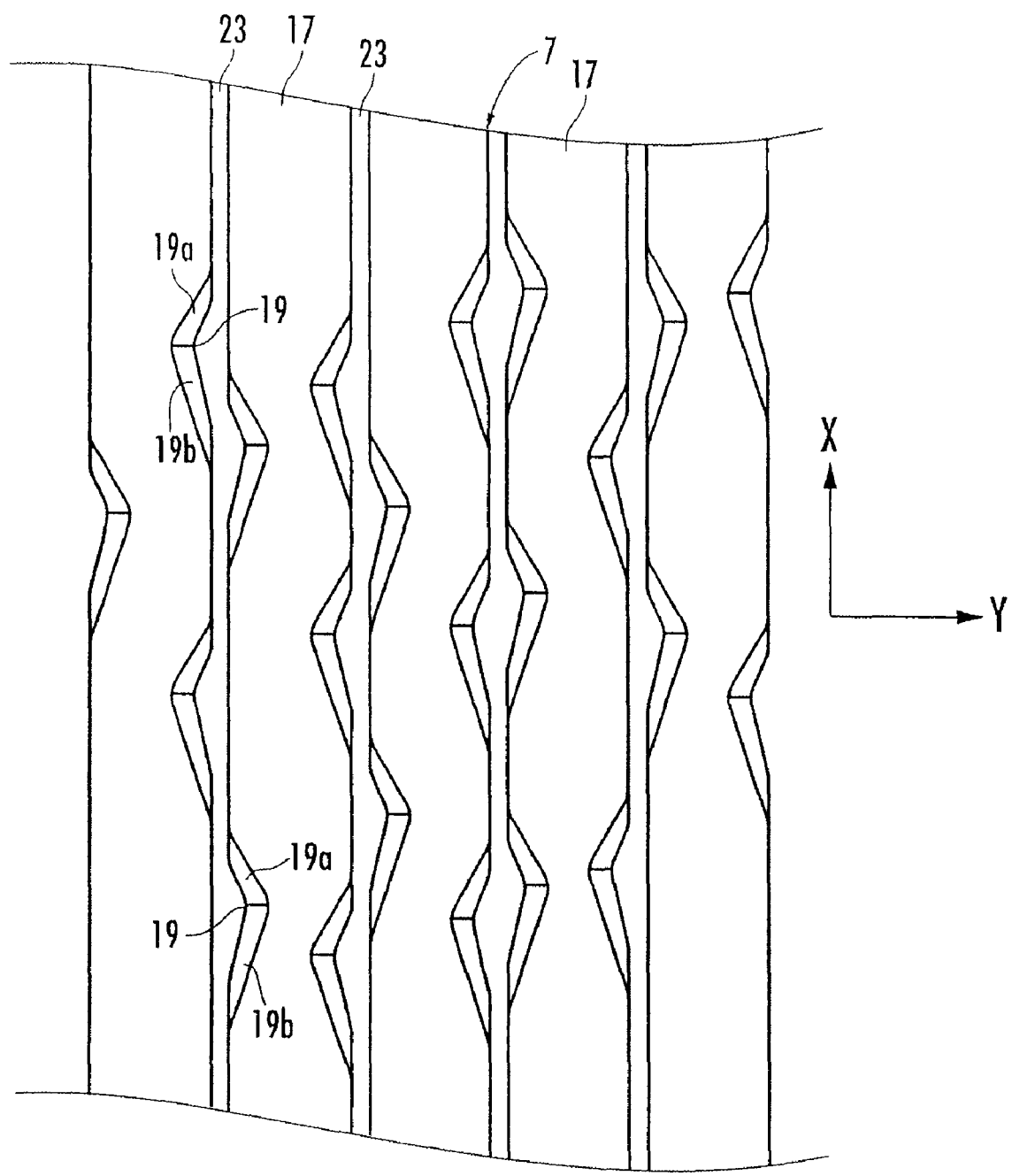
FIG. 5 is a diagram illustrating another example for a configuration pattern of a concave portion formed on a convex strip portion of the light guiding plate.

Additionally, in the aforementioned embodiment, the concave portions 19 and 19 formed on the respective side surfaces opposing to each other of the mutually adjacent convex strip portions 17 and 17 are provided axisymmetrical with respect to the central axis between the convex strip portions 17 and 17, however, it is not necessary. For example, it is possible to provide a plurality of concave portions 19 with different patterns on the side surfaces of each convex strip portion 17, as illustrated in FIG. 5. Herein, FIG. 5 is a plane view of the front surface 7b of the light guiding plate 7 viewed in Z axial direction.

In the aforementioned embodiment, the inner wall of each concave portion 19 is constituted from two flat planes 19a and 19b, however, it is possible for it to be formed from three or more than three flat planes.

In the aforementioned embodiment, the convex strip portions 17 are provided on the front surface 7b of the light guiding plate 7, however, it is possible to provide the convex strip portions 17 on the back surface 7c thereof. In this case, it is possible to form a plurality of prisms on the front surface of the light guiding plate 7, or form the front surface to a mirror shape.

In the aforementioned embodiment, the width of the light guiding plate 7 is configured as constant, however, it is also possible to form the light guiding plate 7 in such a way that the width is gradually decreased from the light incidence plane 7a1 toward the opposite side surface 7a2 of the light guiding plate 7.

Although the present invention has been explained in relation to the preferred embodiment and drawings but not limited, it should be noted that other possible modifications and variations made without departing from the spirit and scope of the invention will be comprised in the present invention. Therefore, the appended claims encompass all such changes and modifications as falling within the gist and scope of the present invention.

What is claimed is:

1. A surface illuminant equipment which includes a light guiding plate for guiding a source light from a light incidence plane which is set from at least one side surface from a pair of side surfaces opposing to each other; a prism sheet disposed opposing to a light emitting plane which is set from a front surface of the light guiding plate having a front surface and a back surface; and a reflection sheet disposed opposing to the back surface of the light guiding plate, comprising: a plurality of substantially parallel convex strip portions integrally formed with the light guiding plate on either one of the front surface and the back surface of the light guiding plate, fully extending in a direction from one side surface of the pair of side surfaces to the other and disposed in parallel in a direction orthogonal to the extending direction; and a plurality of concave portions formed on a side surface of each of the plurality of convex strip portions with an interval along the extending direction of the convex strip portion, wherein an inner wall of each concave portion is formed from at least two flat planes inclined with respect to three axial directions orthogonal to each other set from the extending direction of each of the plurality of convex strip portions, a width direction of the light guiding plate, and a direction orthogonal to both the extending direction and the width direction, respectively; and wherein in the case where two arbitrary convex strip portions adjacent mutually among the plurality of convex strip portions are set as a first convex strip portion and a second convex strip portion, respectively, the concave portion formed on the side surface of the first convex strip portion closer to the second convex strip portion and the concave portion formed on the side surface of the second convex strip portion closer to the first convex strip portion are axisymmetrical to a central axis between the first convex strip and the second convex strip when either one of the front surface and the back surface is viewed in the width direction of the light guiding plate.

2. The surface illuminant equipment according to claim 1, wherein the inner wall of each concave portion is formed from two flat planes intersected at a penetralia of the concave portion.

3. The surface illuminant equipment according to claim 1, wherein a top surface of each convex strip portion is flat.

4. The surface illuminant equipment according to claim 2, wherein a top surface of each convex strip portion is flat.

\* \* \* \* \*